United States Patent
O'Shaughnessy

[19]

[11] Patent Number: 5,872,510
[45] Date of Patent: Feb. 16, 1999

[54] BICYCLE DIRECTION INDICATOR

[76] Inventor: Michael F. O'Shaughnessy, Athanor, Kiltymon, Newcastle, County Wicklon, Ireland

[21] Appl. No.: 346,737

[22] Filed: Nov. 30, 1994

Related U.S. Application Data

[63] Continuation-in-part of Ser. No. 187,822, Jan. 27, 1994, Pat. No. 5,689,232, which is a continuation of Ser. No. 064,359, May 18, 1993, abandoned, which is a continuation of Ser. No. 854,374, Mar. 19, 1992, abandoned.

[30] Foreign Application Priority Data

Mar. 19, 1991 [IE] Ireland .................................. 903/91

[51] Int. Cl.[6] .................................................. B60Q 1/00
[52] U.S. Cl. ...................... 340/468; 340/427; 340/432; 340/474; 340/475; 362/72; 362/198; 116/53
[58] Field of Search ................... 340/321, 427, 340/432, 463, 465, 468, 474, 475; 248/160; 362/72, 198

[56] References Cited

U.S. PATENT DOCUMENTS

| | | | |
|---|---|---|---|
| 2,416,160 | 2/1947 | Davidson | 340/432 |
| 3,945,337 | 3/1976 | Sweatman | 116/28 R |
| 3,952,727 | 4/1976 | Smith | 262/72 |
| 3,961,596 | 6/1976 | Schieuone | 116/52 |
| 3,972,302 | 8/1976 | Sherman | 116/28 R |
| 4,241,328 | 12/1980 | Lobe et al. | 340/474 |
| 4,309,741 | 1/1982 | Smith | 362/72 |
| 4,656,564 | 4/1987 | Felder | 362/72 |
| 4,825,191 | 4/1989 | Ching-Huri | 340/472 |
| 4,889,303 | 12/1989 | Wolf | 248/160 |
| 4,889,373 | 12/1989 | Wolf | 248/160 |
| 4,894,755 | 1/1990 | Chandler | 340/472 |
| 5,099,222 | 3/1992 | Compagna | 340/474 |
| 5,418,696 | 5/1995 | Izzo, Sr. | 340/468 |

*Primary Examiner*—Edward Lefkowitz
*Attorney, Agent, or Firm*—Scully, Scott, Murphy & Presser

[57] ABSTRACT

A bicycle signalling device that may be releasably mounted on a bicycle. The signalling device includes a holder, first and second elongated flexible arms connected to and extending outward from the holder, and first and second signalling lamps mounted on the first and second arms respectively. Each of the lamps is connected to an electric power source to selectively actuate the lamps. Each of the arms is universally bendable in three mutually orthogonal directions and has sufficient rigidity to retain a configuration imparted thereto. In this way, the arms may be used to position and to hold the lamps at selected positions within a three-dimensional space.

21 Claims, 9 Drawing Sheets

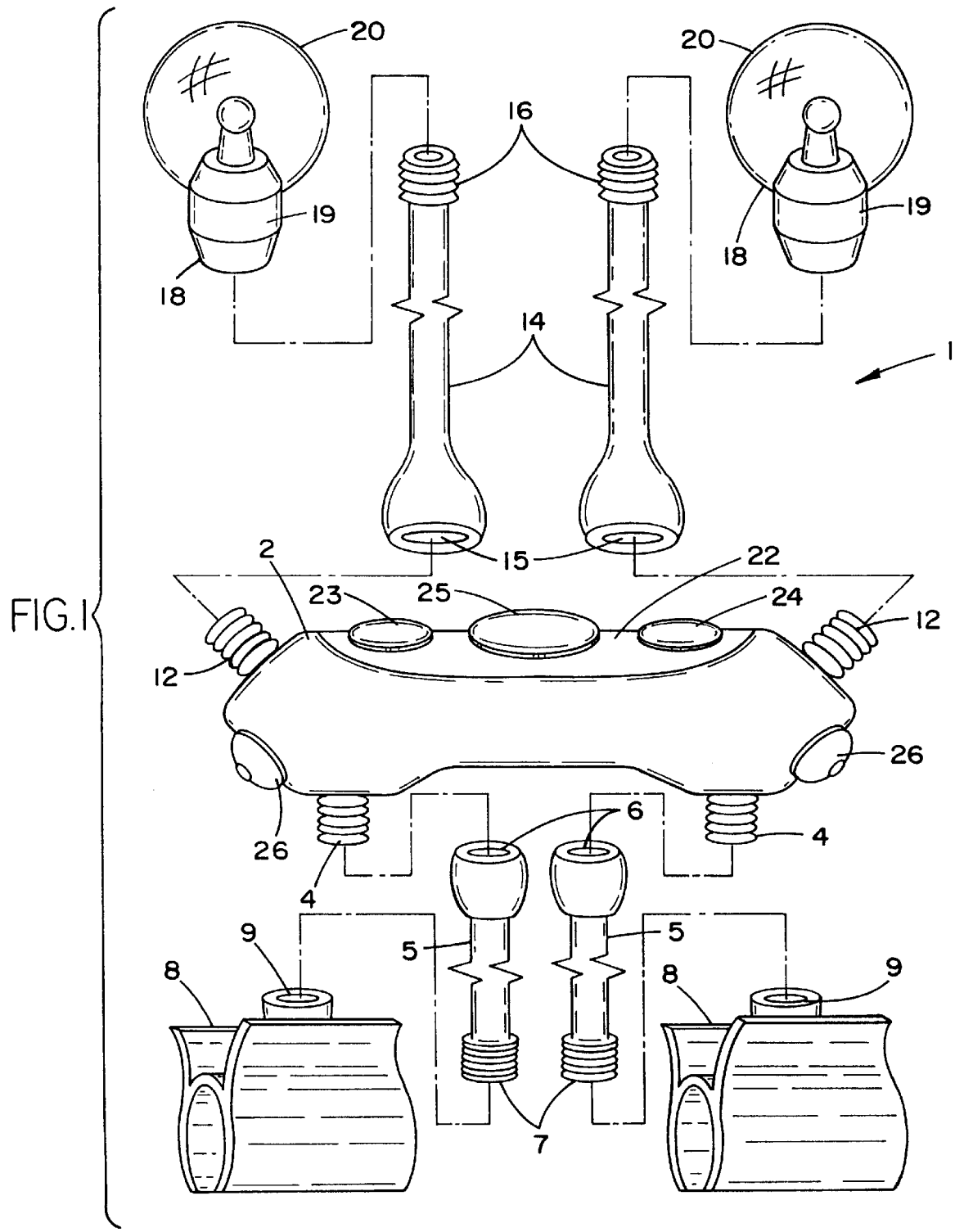

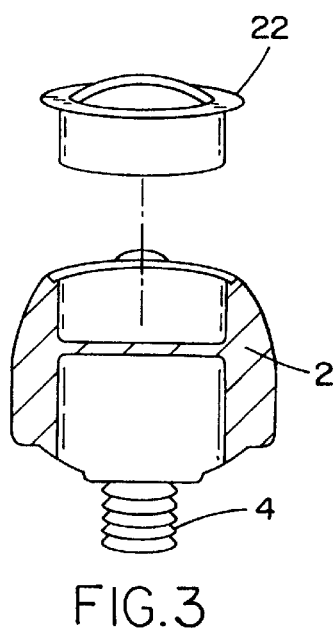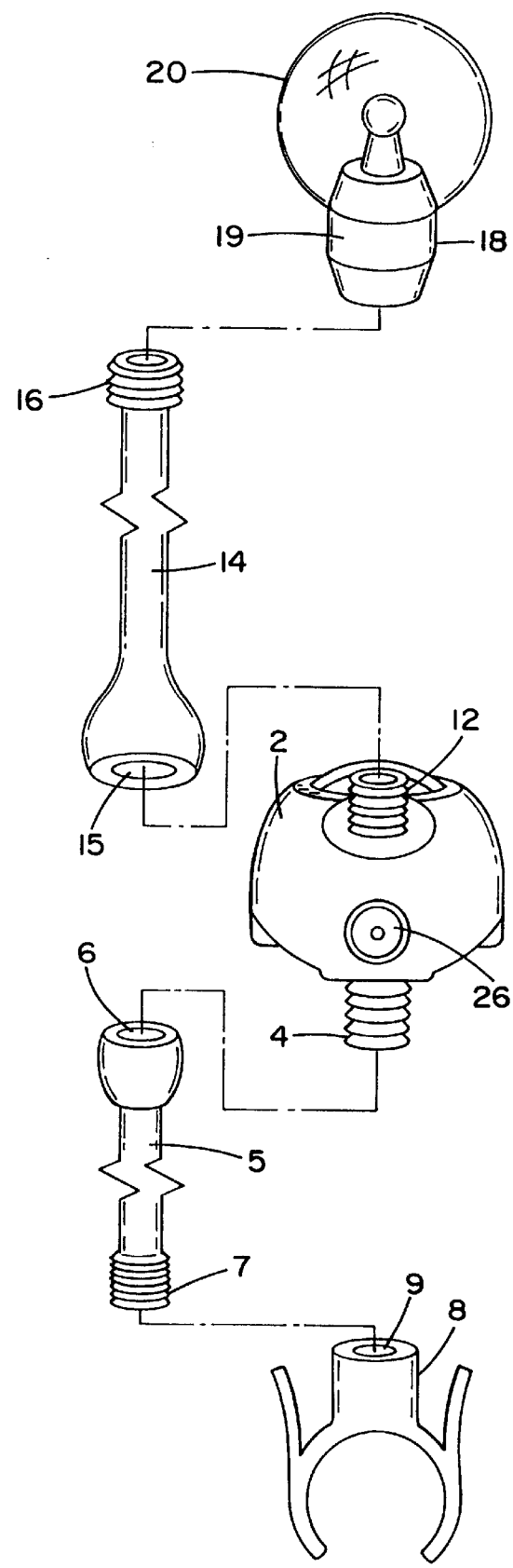

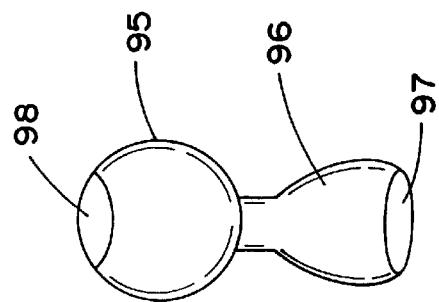
FIG. 27
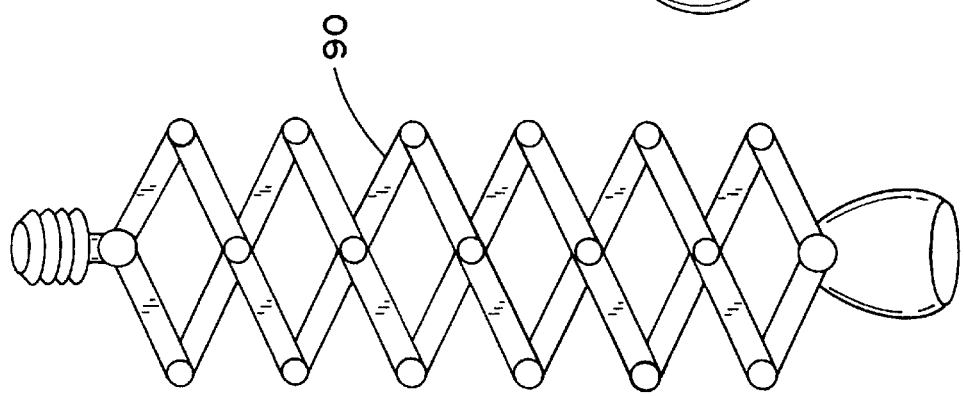
FIG. 26
FIG. 25
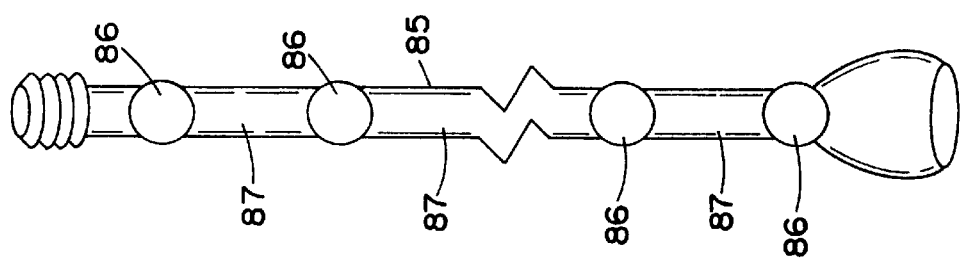
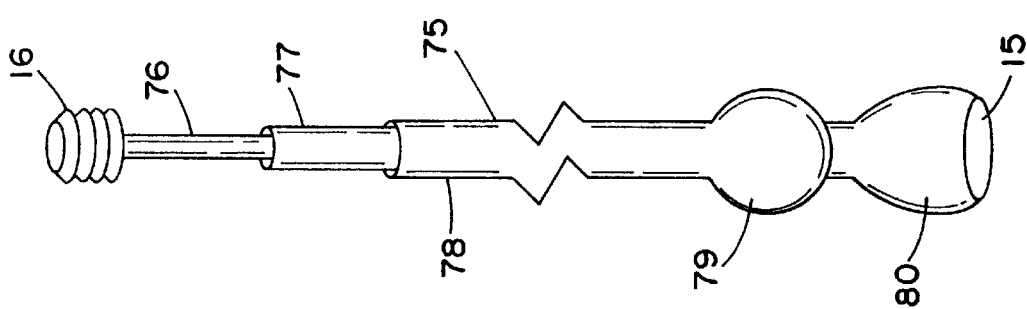
FIG. 24
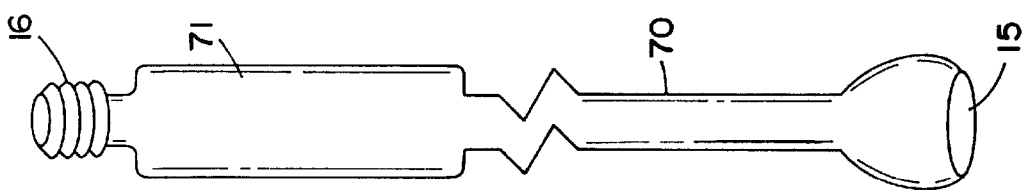
FIG. 23

BICYCLE DIRECTION INDICATOR

This application is a continuation-in-part of application No. 08/187,822 filed Jan. 27, 1994, now U.S. Pat. No. 5,689,232, which is a continuation of prior application No. 08/064,359 filed May 18, 1993, now abandoned, which is a continuation of prior application No. 07/854,374 filed Mar. 19, 1992, now abandoned.

This invention relates to a bicycle direction indicator.

Various options are available to fit direction lamps to many parts of the bicycle, but the lamps may be obscured by the body of the rider from one direction, or more, unless the lamps are positioned above shoulder eight. This represents a distance of approximately 18" (0.5 m), at an angle of approx. 45 degrees (to the horizontal or vertical) from the center (steering pivot) point of the handlebar, to suit an average adult. This can be most simply achieved by a rigid, elongate rod, tube or other extension.

Considering factors of safety, which is the ultimate objective of the device, such a rigid arm was not practical because of its capacity to cause injury in the event of accident.

A longitudinally collapsible arm may be considered for use in such applications, but no suitable such arm was found in the market place. Another essential quality is portability, when the unit is removed from the cycle, for parking or other reason, it must become the smallest package possible. Also critical is the quality that it remain constant in situ., as placed by the user, during motion of the cycle.

None of these qualities was to be found in any available product, the closest approximation was the arm of the type referred to as a "gooseneck" arm. These arms were not suitable for holding bicycle indicators because they would not hold the lamp in a fixed position during normal use of the bicycle. More specifically, the up and down and the swaying motions encountered during normal riding of the bicycle would cause a conventional prior art gooseneck arm to bend or move, and any turn signal attached to the arm would not stay in the desired location.

Also, with the prior art it generally was not practical or feasible to position the lamps at shoulder height and outward from the body—which is where the public is accustomed to seeing the cyclist's hand giving indication. Further, the prior art, as a general rule, did not provide the cyclist with the facility to alter the position of the lamps for optimum visibility in relation to, for example, their posture or environment, at any given time.

The present invention is particularly concerned with bicycle direction indicators of the type described in Irish Patent Application No. 903/91 comprising a pair of elongate flexible arms, each arm having an inner end and an outer end, a pair of lamps, each lamp being mounted at an outer end of one of the arms, mounting means for securing an inner end of each arm to a bicycle, and an outer end of each arm being universally movable in any direction relative to said mounting, the arm being universally bendable to position and hold the lamp at a desired signalling position, and means for connecting each lamp to an electric power supply, said means including switch means for operation of each lamp. The arms are bendable but of sufficient rigidity to retain any set configuration imparted thereto by bending. Thus, a cyclist can readily easily position the lamps in use at any desired signalling position.

SUMMARY OF THE INVENTION

It is an object of this invention to provide an improved arm construction for use in this type of bicycle direction indicator.

It is a further object of the present invention to simplify the construction of the direction indicator to facilitate manufacture.

According to the invention, there is provided a kit for forming a direction indicator for a bicycle comprising a holder, mounting means for securing the holder on a bicycle, said mounting means being engageable with the holder, a pair of elongate flexible arms, each arm carrying a lamp, each arm being engageable with the holder, the arm being universally movable in any direction to position and hold the lamp at a desired signalling position on the holder, means for connecting each lamp to an electric power supply, said means including switch means for operation of the lamps, said switch means being mounted on the holder.

In a preferred embodiment, the arms are releasably engageable with the holder such as by a threaded connection, for example. Conveniently, a threaded socket may be provided at an inner end of each arm for engagement with a complementary threaded stud on the holder. The lamps may also be demountably secured on each arm if desired.

In a further embodiment, the mounting means is releasably engageable with the holder. Preferably, the mounting means comprises a pair of support legs, each leg having an inner end and an outer end, a threaded socket being provided at the inner end for engagement with a complementary threaded stud on the holder, a spring clip for engagement with the bicycle being provided at the outer end. If desired, the spring clip can be demountably attached to the leg.

In a further embodiment, an audible indicator is provided which is engageable with the holder. Preferably, the audible indicator is engageable with an associated socket on the holder.

In a further embodiment, the switch means is a switch plate assembly having switches for operation of each lamp and the audible indicator, the switch plate assembly being engageable within a complementary slot in the holder for mounting the switch plate assembly on the holder.

In a particularly preferred embodiment, each arm is formed by one or more coiled elements having overlapping surfaces which interengage to support the arm in any set configuration.

In another embodiment, the arm is formed by a single coiled element having overlapping surfaces which frictionally interengage. For additional support, a core may be mounted within the coils of the element, an outer surface of the core being frictionally engageable with an inner surface of the element.

In a further embodiment, the arm comprises a pair of elements, namely, an inner element having a spiral groove in its outer surface and a complementary outer element which sits in the groove and is frictionally engageable with the groove surface to support the arm in any set configuration.

In another aspect, the invention provides a bendable support arm particularly for holding objects such as lamps, microphones, musical instruments, and the like in a set position, the arm having sufficient rigidity to retain any set configuration imparted to the arm by bending the arm.

In one embodiment of this aspect of the invention, the arm is formed by one or more coiled elements having overlapping surfaces which interengage to support the arm in any set configuration.

In another embodiment, the arm is formed by a single coiled element having overlapping surfaces which frictionally interengage. For additional support, a core may be mounted within the coils of the element, an outer surface of the core being frictionally engageable with an inner surface of the element.

In another embodiment, the arm comprises a pair of elements, namely, an inner element having a spiral groove in its outer surface and a complementary outer element which sits in the groove and is frictionally engageable with the groove surface to support the arm in any set configuration.

BRIEF DESCRIPTION OF THE DRAWINGS

The invention will be more clearly understood from the following description of some embodiments thereof, given by way of example only, with reference to the accompanying drawings, in which:

FIG. 1 is an exploded view of a bicycle direction indicator according to the invention;

FIG. 2 is an exploded and elevational view of the indicator;

FIG. 3 is a detail exploded sectional and elevational view of a holder forming portion of the indicator;

FIGS. 23–26 are elevational views of alternative arm constructions for use with the bicycle indicator;

FIG. 27 is a schematic illustration of a holographic projector which can be used as an alternative to the arm and lamp arrangements of the indicator;

DETAILED DESCRIPTION OF THE PREFERRED EMBODIMENTS

Figure 4:
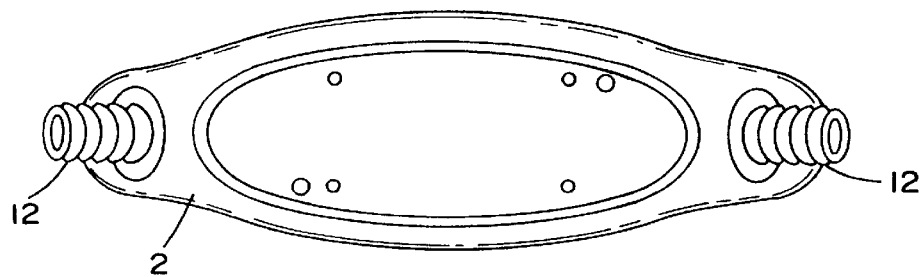
FIG. 4 is a top plan view of the holder.
Figure 7:
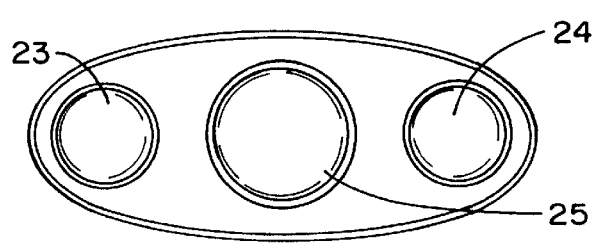
FIG. 7 is a plan view of a switch plate mounted on the holder.
Figure 6:
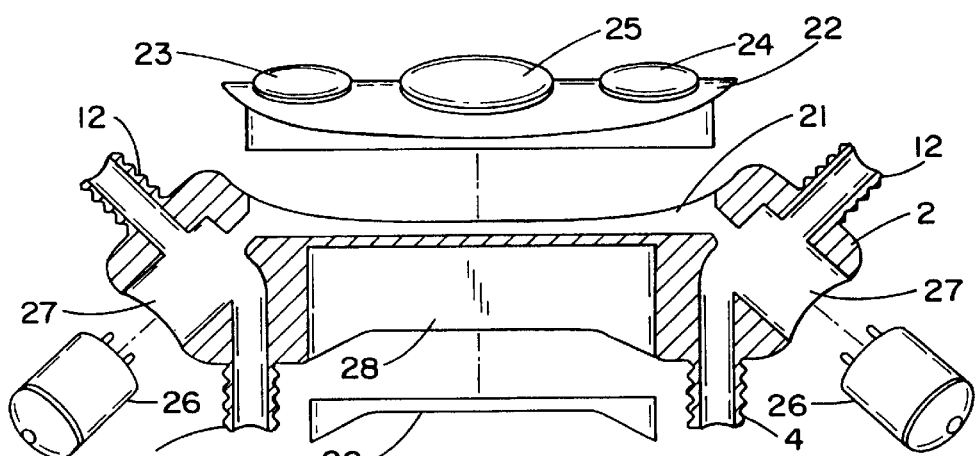
FIG. 6 is an exploded front sectional elevational view of the holder.
Figure 8:
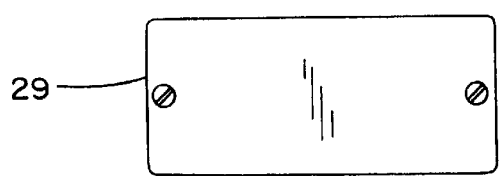
FIG. 8 is an underneath plan view of a battery compartment cover for the holder.
Figure 5:
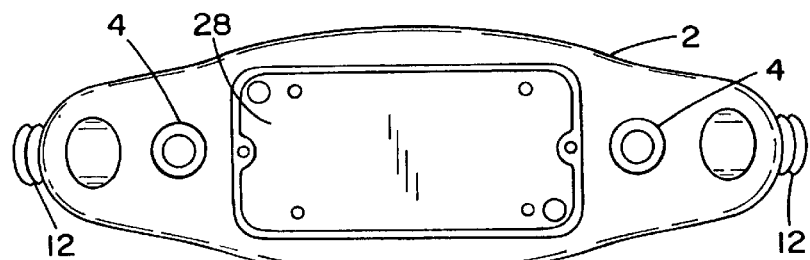
FIG. 5 is an underneath plan view of the holder.

Referring to the drawings, and initially to FIGS. 1 to 9 thereof, there is illustrated a bicycle direction indicator indicated generally by the reference numeral 1. The indicator 1 has a molded holder 2. A pair of spaced-apart threaded leg studs 4 are integrally formed with the holder and project downwardly from an underside of the holder 2. A pair of mounting legs 5 have sockets 6 at their upper ends for engagement with the studs 4. A lower end 7 of each leg 5 is threaded for mounting spring clips 8 at the lower end 7 of each leg 5. The spring clips 8 have a threaded socket 9 for engagement with the lower end 7 of each leg 5. A pair of arm mounting studs 12 are integrally formed with the holder 2 and project outwardly of the holder 2 at a top of the holder 2. Flexible lamp support arms 14 have threaded sockets 15 at their lower end for engagement with the studs 12 to mount the arms 14 on the holder 2. An upper end 16 of each arm 14 is threaded. A lamp assembly 18 is mounted on each arm 14. Each lamp assembly 18 has a body 19 with a threaded socket for engagement with the upper end 16 of one of the arms 14. An indicating lamp 20 is carried on the body 19. The arms 14 are hollow for a through passage of electric wires for connection of the lamps 20 to a battery power supply mounted on the holder 2. Various preferred arm constructions are described later with reference to FIGS. 14 to 26 of the drawings.

A switch plate 22 is mounted in a slot 21 at a top of the holder 2 and has indicating lamp switches 23,24 for operation of the lamps 20. A central switch 25 controls operation of audible indicators 26 mounted in associated sockets 27 on the holder 2. Operation of each lamp switch 23,24 simultaneously operates one of the audio indicators 26. A battery compartment 28 closed by a cover 29 is formed at a bottom of the holder 2. Alternately, holder 2 may include one or more removable end caps to provide access to the interior of the holder to allow battery installation.

The components of direction indicator 1 may be made in any suitable manner and from any suitable materials. For example, holder 2, mounting legs 5, spring clips 8, and support arms 14 may be made from high density polyethylene, although manufacturers may prefer other materials to suit their individual market strategies and requirements. Also, holder 2, excluding switch plate 21, may be molded as a single unit, or assembled from component parts. The prime function of the holder is as a chamber for the battery pack, which therefore regulates the volume according to the selected battery size and quantity. This volume may then be modelled to derive any particular style, shape, or theme.

In use, to form the indicator 1, the legs 5 with their associated clips 8 and the arms 14 and associated lamp assemblies 18 are mounted on the holder 2. It will be appreciated that arms 14 and legs 5 of various different lengths or configuration may be attached to the holder 2. Thus, an indicator 1 may be constructed as required to suit a particular bicycle and the cyclist using the bicycle. The arms 14 are of flexible material which can be bent into any desired signalling position by the cyclist. The legs 5 mounting the holder 2 on the bicycle may be of rigid material or alternatively may be of a flexible material similar to the arms. Advantageously, the construction of the indicator is such that a standard housing or holder is provided which may be adapted to suit a very wide range of bicycles and cyclist by simple alternative fitments of arms and legs on the housing.

Figure 9:
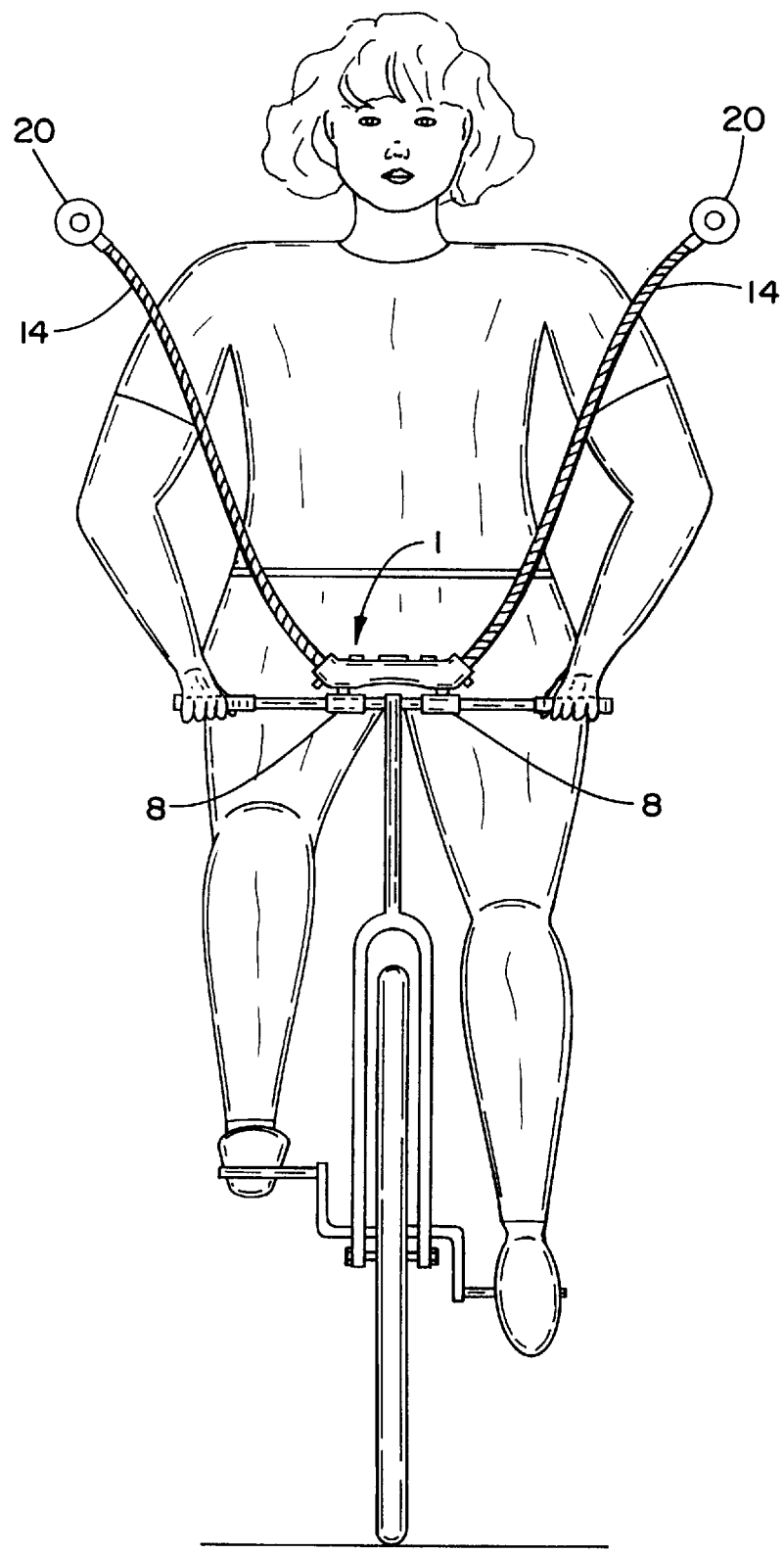
FIG. 9 is a front elevational view showing the bicycle direction indicator in use mounted on a bicycle.

FIG. 9 shows the indicator 1 in use. It will be noted that the arms 14 are of a length such that the lamps 20 can be positioned in a signalling position between the elbows and shoulders outwardly of the cyclist, as shown in the drawing.

Figure 13:
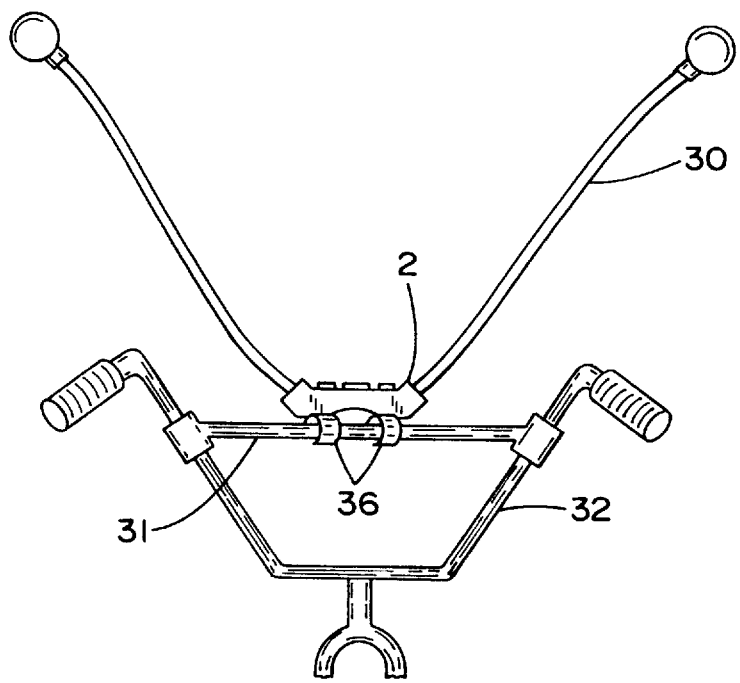
FIG. 13 is a front elevational view showing the indicator mounted on a bicycle by means of the mounting bracket.
Figure 12:
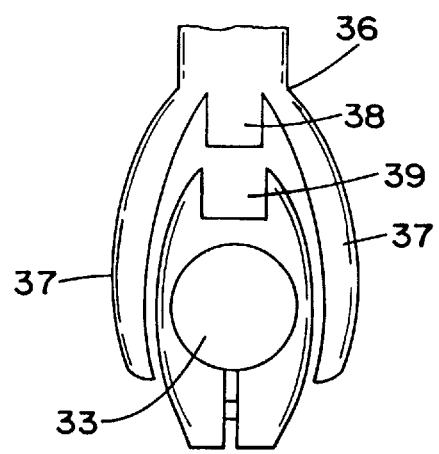
FIG. 12 is a detail view showing engagement of an indicator with the mounting bracket.
Figure 10:
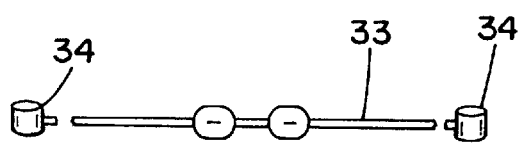
FIG. 10 is a front elevational view of a mounting bracket for mounting the direction indicator on a bicycle handlebars.
Figure 11:
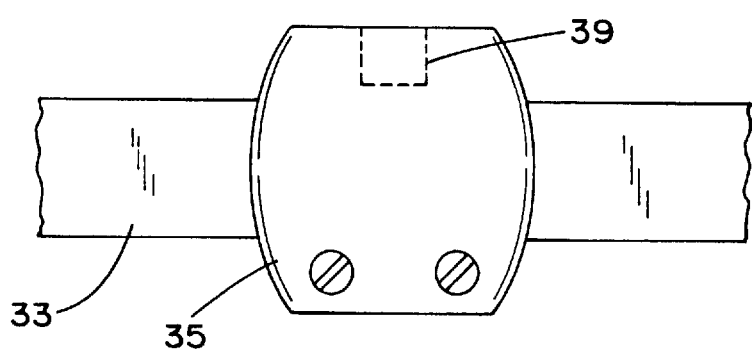
FIG. 11 is a detail view of portion of the mounting bracket.

Referring now to FIGS. 10–13, there is shown another bicycle indicator 30. The indicator is shown with an associated mounting bracket 31 for mounting the indicator 30 on a bicycle having U-shaped handlebars 32 as shown in FIG. 13. The mounting bracket 31 has a bar 33 with a clamp 34 at each end for engagement with the handlebars 32. A pair of indicator supports 35 are fastened on the bar 33. Spring clips 36 on the holder 2 are releasably engageable with the indicator supports 35. Each spring clip 36 has resilient arms 37 for snap engagement with the supports 35. A locating spigot 38 on each spring clip 36 engages with a complementary socket 39 at the top of each indicator support 35.

Figure 15:
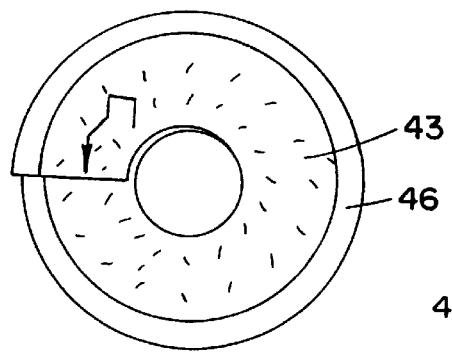
FIG. 15 is a top plan view of the arm portion shown in FIG. 14.
Figure 18:
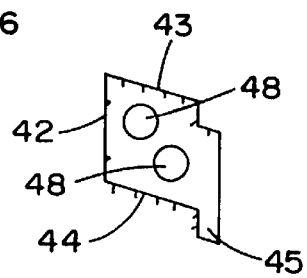
FIG. 18 is a detail sectional view of a coil forming portion of the arm.
Figure 14:
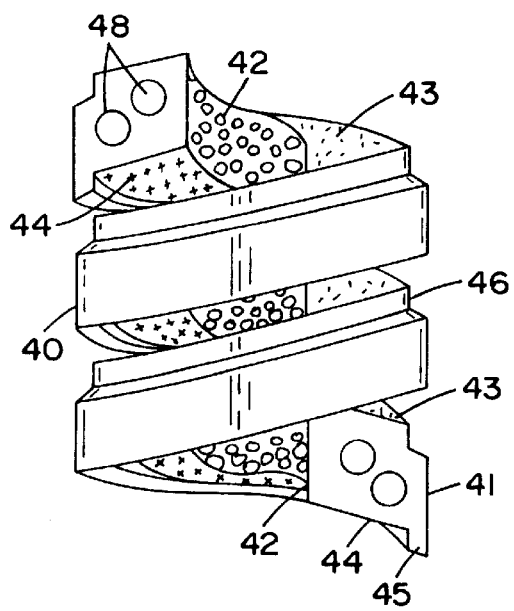
FIG. 14 is a detail front elevational view of portion of a lamp support arm for the indicator.
Figure 19:
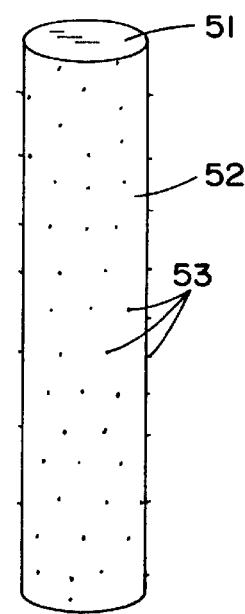
FIG. 19 is an elevational view of a core element forming portion of the arm of FIG. 17.
Figure 17:
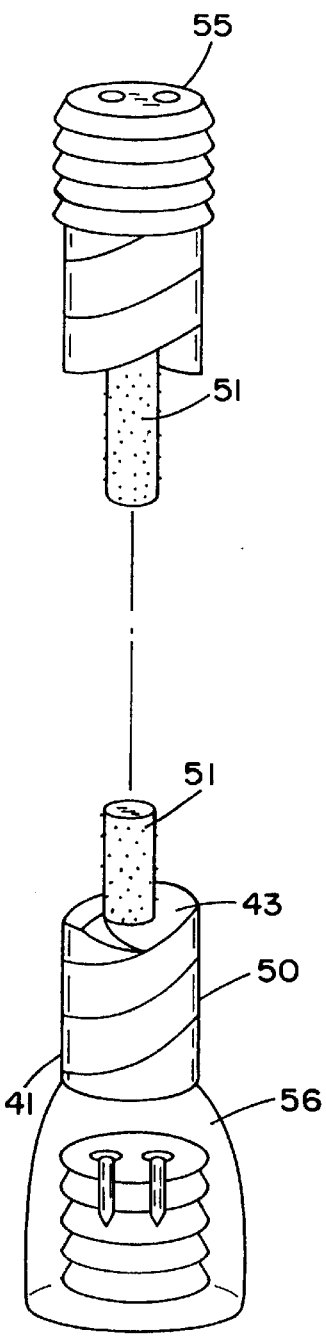
FIG. 17 is a partly cut away elevational view of another arm.
Figure 16:
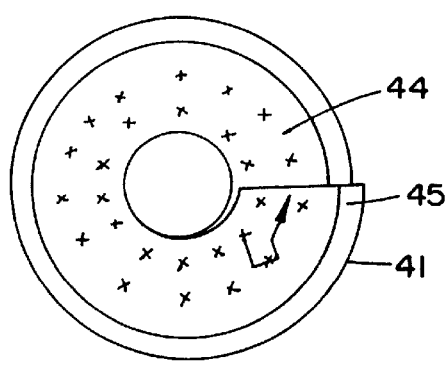
FIG. 16 is an underneath plan view of the arm portion shown in FIG. 14.
Figure 20:
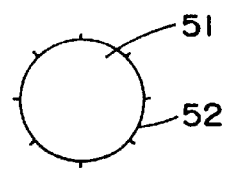
FIG. 20 is a plan view of the core element.

Referring now to FIGS. 14–16, there is shown a coil segment 40 forming portion of each flexible arm 14 of the bicycle indicator. The segment 40 is a portion of an elongate coiled element forming the arm, the element having an outer surface 41, an inner surface 42, an upper surface 43, and a lower surface 44. It will be noted that a downwardly projecting peripheral rim 45 at an outer edge of the lower surface 44 is engageable with a complementary peripheral groove 46 at an outer edge of the upper surface 43 so that the coils of the element snugly fit together. Complementary interengageable formations are formed on the upper surface 42 and lower surface 44 so that they frictionally interengage to hold the arm in any set position while allowing universal bending of the arm. Electric cables 48 are mounted within the arm element to deliver power supply from a battery in the holder to the lamps.

Referring now to FIGS. 17 to 20, there is illustrated another flexible arm 50 similar to the arm described with reference to FIGS. 14–16 and like parts are assigned the same reference numerals. In this case, the arm 50 has a core element 51 which passes up through a center of the coil. The core 51 has an outer surface 52 with formations 53 which interengage with complementary formations on the inner surface 42 of the coiled element. This core 51 extends between an upper end cap 55 and a lower end cap 56 of the arm 50 to keep the coil under compression. The core 51 gives additional support to the arm 50. As previously described, the arm can be universally bent in any direction and will retain any set bent position due to the frictional interengagement of the upper and lower surfaces of the coil element and the frictional interengagement of the inner surface 42 of the coil element with the core 51.

Figure 22:
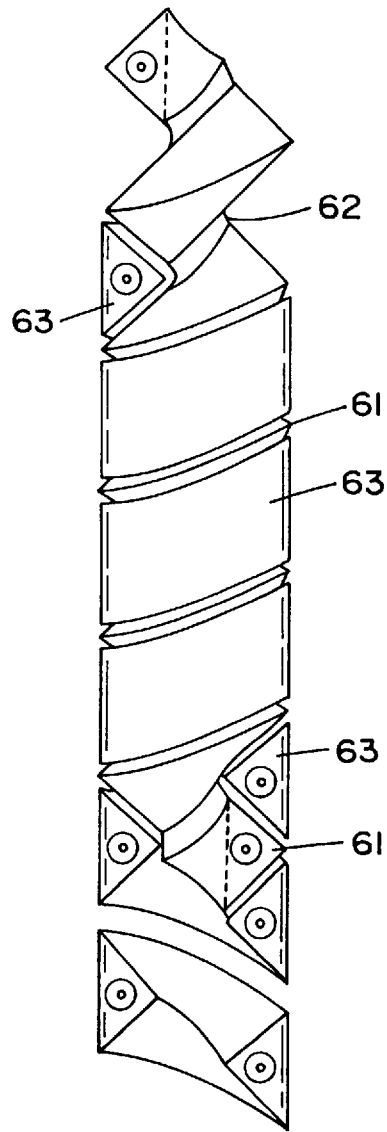
FIG. 22 is a detail view of portion of the arm of FIG. 21.
Figure 21:
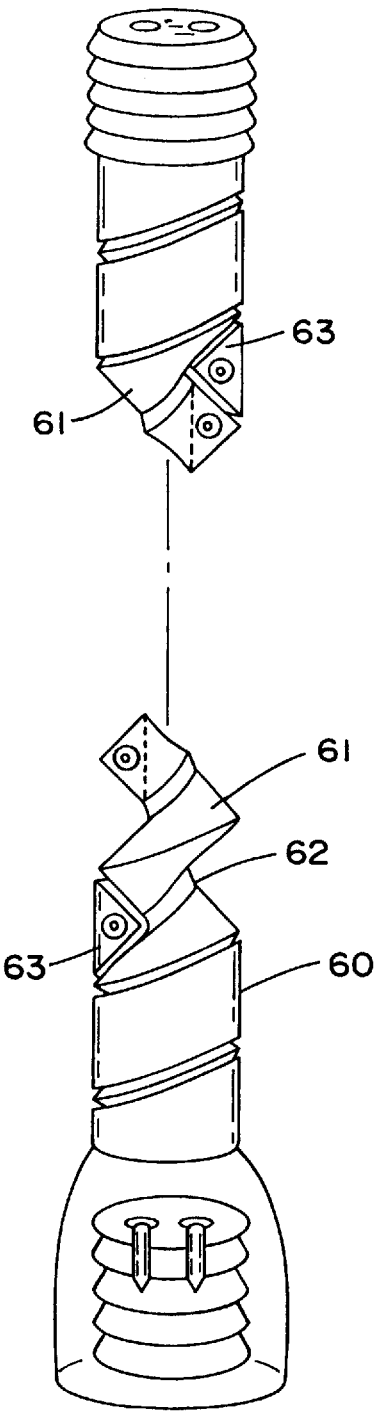
FIG. 21 is a partially cut away elevational view of another arm.

Referring now to FIGS. 21 and 22, there is shown another flexible arm 60. In this case, the arm 60 is formed by an inner element 61 having a V-shaped groove 62 at its outer surface. An outer element 63 is wound around the inner element 61 engaging within the groove 62. The outer element 63 is of triangular section. Mating faces of the elements 61, 63 frictionally interengage to hold the arm 60 in any set position.

It will be appreciated that the bendable support arms shown in FIGS. 14–22 may be used in applications other than bicycle indicators, particularly where those other applications require an arm that can be bent in any direction and will hold itself in any bent position. Other applications include lamp supports for desk lamps or standard lamps for example.

Referring now to FIGS. 23–26, FIG. 23 shows a flexible arm 70 having a socket 15 at its lower end for attachment to the holder 2. Adjacent the outer end 16, a battery compartment 71 is provided for reception of a battery to power a lamp assembly 18 mounted on the arm 70.

FIG. 24 shows another arm 75. In this case, the arm 75 is of telescopic construction having a number of telescopic elements 76, 77, 78 which slidably interengage for outward extension of the lamp assembly mounted on the arm 75. A universal ball joint assembly 79 is provided adjacent a lower end 80 of the arm 75 to allow universal movement of the arm relative to the holder.

FIG. 25 shows another arm 85 which in this case comprises a number of arm elements 87 interconnected by ball joints or hinges 86 to allow universal movement of a lamp assembly mounted on the arm 85 relative to the holder 2 on which the arm 85 is mounted.

FIG. 26 shows an alternative scissors type arm construction 90.

As will be understood by those of ordinary skill in the art, the components of arms 40, 50, 60, 70, 75, 85, and 90 may be made from any suitable materials and in any appropriate manner. For example, elements of arms 40, 50, and 60 may be made from high density polyethylene, but here again manufacturers may prefer other materials to suit their individual market strategies and requirements. In particular, elements of these arms may be extrusion molded, cut to length and then capped at both ends to engage respectively with a lamp unit at the top and the holder at the bottom. Alternatively, individual elements of these arms may be injection molded to preset lengths.

An important advantage of the preferred embodiment of this invention is the detachability of the arms from the body unit. As suits manufacturing processes, the arm, being made apart from the body unit, is brought to join with the body unit by the interconnection of complementary parts of any of various formations, FIGS. 1:12 and 15 and FIG. 29. By design, the arms being replaceable and changeable subcomponents, the force required to join and detach them to and from the body unit is a moderate hand effort, pushing and pulling with a nominal 1 lb. force per 0.5 second. A further aspect of this connection is to provide means to allow the arms to become detached by a similar force in the event of entanglement with, for example, vegetation, road features or other unavoidable predicament, such that the cycle is not pulled from its course by entrapment of the arms.

FIG. 27 shows schematically a holographic projector 95 having a body 96 with a threaded socket 97 for mounting on the studs 12 on the holder 2. A light projector 98 is operable to project a light signal outwardly of the cyclist.

Figure 28:
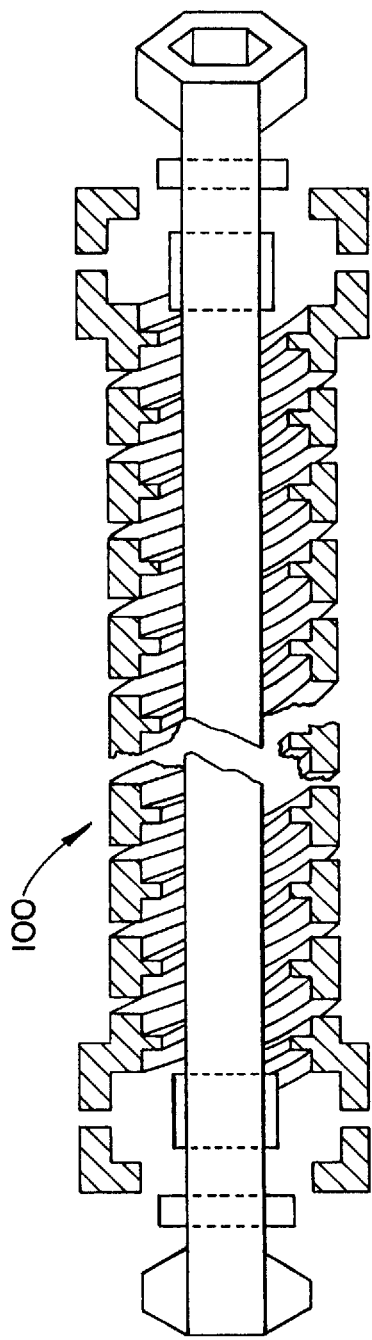
FIG. 28 schematically illustrates a tool design for the manufacture of an arm element that may be used in the present invention.

FIG. 28 represents a tool design 100, for the injection molding process, for the manufacture of the arm element. Precoiled conductor inserted onto jig, and may, or not, be pre-insulated. In some instances of manufacture, the interlocking surface texture may be incorporated at this stage, as a continuous coiled strip or as segments. This is when the material selected for the coil does not have the capacity to be appropriately surface texturized.

An example of surface texture is a pyramidal or angular indentation on both adjacent surfaces which will produce effective frictional interlock. A multitude of alternate interlocking surface formations are comparably effective.

This variety will be used in relation to the range of styles of the device when the dimensions and shapes of the components will vary. An example of this is a design where the arm is represented as the elongation of the body unit with a diminishing diameter along its length to the lamp housing.

This style would be particularly suitable for the tooling configuration (FIG. 28). A nominal arm outer diameter is ½" but this can vary considerably. The arm length will vary in relation to a combination of the cycle size and the cyclist's height, an 18" length is an approximate maximum.

Figure 29:
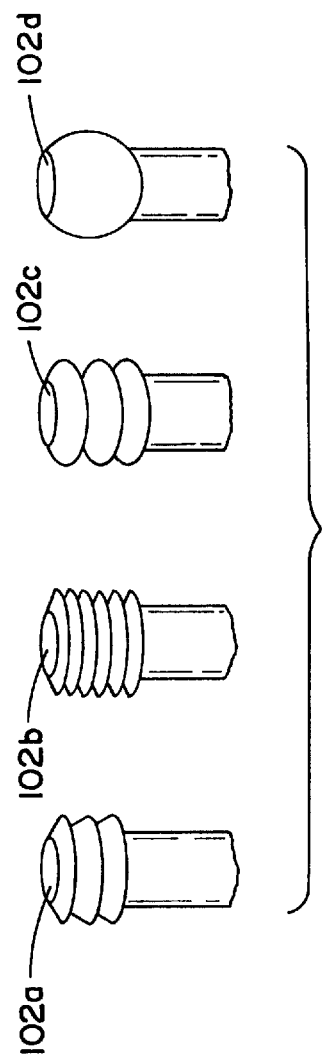
FIG. 29 shows various gripper formations that may be used on the arm elements employed in this invention.

Core shaft, in two parts, joins from both ends and incorporates injection channels, and comprises inner surface, with appropriate texture; end cap inner (to receive electric fitment connector and core tensioner element) with appropriate gripper formations, shown at 102a, 102b, 102c and 102d in FIG. 29. Tool outer component comprises end cap elements and coil forming segments with appropriate surface texturing facility. The cutaway figure denotes the tool outer in expanded mode, between injection cycles. During injection, the mold is formed by longitudinal compression and sealing of the components.

The coil may be formed under or over operating tension which will determine whether it is tensed to expand or contract when it is fully extended in operating position. It is this energy that is available to produce friction between the adjacent interlocking sides (surfaces), the texture and interlocking quality and effective direction of which will be appropriately designed.

The inner retainer connecting the endcaps through the coil provides the degree of elasticity required to compress the coil in its extended operating condition and maintain its flexible axis. A minimal stretch (1% approx.) in the length is used to disengage the interlocking surfaces to allow the arm to collapse to be folded for storage.

Extending the arm from this condition is achieved by drawing it out along its length from the base placing the lamp unit in its desired location, within the limits of the particular design. A twisting action may be used as a final locking of the formation of the extended arm.

Depending on the sophistication of a design variation, it may be desirable to incorporate other means of locking the formation such as a threaded interface within or between the endcap and lamp unit assemblies, the function of which is to sustain the optimum retaining tension in the arm, by altering (adjusting) the inner retainer length. This might also be ratchet-set by virtue of the flexibility or elasticity of the material, and may be positioned also at the base of the arm.

A further design option is making use of a Velcro type interlocking surface arrangement where there may be no need for a retaining core. The coil may also be formed as a flat ribbon with interlocking adjacent surfaces on the vertical sides. Here, the lamp unit, fixed to the center of the coil, is held and drawn out to the extent of the arm, forming a cone, when a twist will lock the formation and again release it, when it will recoil untensioned into a storage position.

The inner core may also be treated with a matching or complementary surface texture to interlock with the inner surface texture of the coil.

An outer sleeve may be used to complement or replace the inner core in which case the outer surface of the coil is treated with an interlocking texture to react with the inner surface texture of the sleeve.

A very simple arm construction, which some market forces may demand, is considered. A simple flexible tube into which is inserted the insulated conductors and a length of flexible metal wire. The ends are appropriately terminated.

Alternately, the arm elements may be manufactured by extrusion process and cut to the required lengths. The conducting element, in the conventional manner, is insulated by the formation of a sleeve along its length. This sleeve may be made as the coil body or a further coating process may bring it to be the coil body. This cable will ideally have a rectangular section. After this formation is completed it is fed into a treatment process whereby the desired surface texture is produced on the appropriate faces or surface areas.

Various means are available to perform this function, for example, heated texturising rollers will impart a texture to the cable drawn through them, other means include chemical and thermal bonding and welding and adhesives. This stage of production is then wound off to form the coil, and subsequently cut to appropriate lengths.

Further processing involves electrical and mechanical connections and components, such as the end cap, and insertion of tension core to be welded, or otherwise connected, to complete the arm unit with the correct elasticity, rigidity and flexibility. Conductors may be contained in outer coil, inner core (solid) or conventional cable through hollow inner core.

Means other than electric cable may also be used to carry energy from the switched power source and signal generator to the transmitter element to be transmitted at any selected frequency of the electromagnetic spectrum such as visible light, radio, and audio frequencies.

The operational switches may be tactile, optoelectrical or audio activated and also remote in any position on or off the device.

While it is apparent that the invention herein disclosed is well calculated to fulfill the objects previously state, it will be appreciated that numerous modifications and embodiments may be devised by those skilled in the art, and it is intended that the appended claims cover all such modifications and embodiments as fall within the true spirit and scope of the present invention.

What is claimed is:

1. A bicycle signalling device comprising:

a holder;

first and second elongated flexible arms connected to the holder and extending outward therefrom;

first and second signalling lamps mounted on the first and second arms respectively;

means for connecting each of the lamps to an electric power source to selectively actuate the lamps; and means connected to the holder for releasably mounting the holder on a bicycle;

wherein each of the arms is universally bendable in three mutually orthogonal directions and has sufficient rigidity to retain a configuration imparted thereto, to position and to hold the lamps mounted on the arms at selected positions within a three-dimensional space; and wherein:

the holder includes i) a body, ii) mounting stud means connected to and extending outward from the body, iii) leg stud means connected to and extending outward from the body, and iv) leg means mounted on the leg stud means;

the first and second arms are mounted on the mounting stud means; and the means for releasably mounting the holder on a bicycle are connected to the leg means of the holder.

2. A bicycle signaling device according to claim 1, wherein each of said arms includes an arm member formed into an elongated helical coil.

3. A bicycle signalling device according to claim 1, wherein each of the arms is universally bendable, in each of three mutually orthogonal directions, at a multitude of locations along the length of the arm.

4. A bicycle signalling device according to claim 1, wherein each of the arms is universally bendable, in each of three mutually orthogonal directions, along substantially the complete length of the arm.

5. A bicycle signalling device according to claim 2, wherein the arm member of each of the arms forms an upper surface and a lower surface, the upper and lower surfaces of each of the arm members are in contact with each other, and each of the arm members includes a multitude of formations on the upper and lower surfaces of the arm member, said formations frictionally interengage with each other to hold the arm member in a configuration imparted thereto while allowing universal bending of the arm.

6. A bicycle signalling device according to claim 2, wherein:
   said helical coil includes an inside surface forming an elongated interior conduit;
   each of the arms further includes
      i) a core member located in said conduit and having an outside surface, and
      ii) a multitude of formations on the inside surface of the helical coil and the outside surface of the core member; and
   said formations frictionally interengage with each other to hold the arm members in a configuration imparted thereto while allowing universal bending of the arm.

7. A bicycle signalling device according to claim 2, wherein:
   said helical coil forms an elongated interior conduit;
   each of the arms further includes a core member located in said interior and forming an outwardly facing helical groove;
   the arm member extends into the helical groove and frictionally engages the core member; and
   said frictional engagement holds the arm in a configuration imparted thereto while allowing universal bending of the arm.

8. A bicycle signalling device according to claim 1, wherein the first and second arms have sufficient stiffness to hold the first and second lamps in fixed positions during normal use of the bicycle.

9. A bicycle signalling device according to claim 1, wherein:
   each of the mounting studs includes a threaded end;
   each of the first and second arms includes a threaded inner end threaded onto a respective one of the mounting studs;
   each of the legs studs includes a threaded end; and
   each of the legs includes a threaded inner end threaded onto a respective one of the leg studs.

10. A bicycle signalling device according to claim 1, wherein:
   the holder forms an interior for holding a battery;
   the means for connecting each of the lamps to an electric power source includes first and second electric wires;
   said first wire extends from the housing, through the first arm and is connected to the first lamp; and
   said second wire extends from the housing, through the second arm and is connected to the second lamp.

11. A bicycle signalling device according to claim 1, wherein:
   the holder includes
      i) a main body portion for holding a battery and forming a top opening, and
      ii) a cover located in and covering said top opening, and connected to the main body portion; and
   the first and second switches mounted on the cover portion of the holder for selectively electrically connecting the first and second signalling lamps to the battery.

12. A bicycle signalling device according to claim 1, wherein the means for releasably mounting the holder on a bicycle includes at least one spring clip connected to the holder for releasably clipping the holder onto the bicycle.

13. A bicycle signalling device according to claim 2, wherein each of the arms includes an inner element having a V-shaped groove.

14. A bicycle signalling device according to claim 13, wherein each of the arms further includes an outer element wound around the inner element of the arm and engaging within the V-shaped groove of the inner element of the arm.

15. A bicycle signalling device according to claim 14, wherein the outer element of each of the arms has a triangular section.

16. A bicycle signalling device according to claim 15, wherein the inner and outer elements of each of the arms frictionally interengage and hold the arm in any set position.

17. A bicycle signaling device according to claim 1, wherein a bicyclist rides on the bicycle, and each of the arms can be moved to a position laterally extending outwardly of the bicyclist and above the bicyclist's shoulder.

18. A bicycle signalling device according to claim 1, wherein each of the arms has a longitudinal axis, and each of the arms is collapsible along the longitudinal axis of the arm.

19. A bicycle signalling device according to claim 1, wherein:
   the mounting stud means includes a pair of mounting studs connected to and extending outward from the body;
   the leg stud means includes a pair of leg studs connected to and extending outward from the body; and
   the legs means includes a pair of legs mounted on the leg studs.

20. A bicycle signalling device comprising:
   means for mounting the signalling device on a bicycle;
   first and second elongated, pliant arms connected to the mounting means and extending therefrom, each of the arms including
      i) an inner end connected to the mounting means, and
      ii) an outer end;
   first and second signalling lamps mounted on the outer ends of the first and second arms respectively; and
   means for connecting each of the signalling lamps to an electric power source to selectively actuate the lamps;
   wherein each of the arms is universally bendable in three mutually orthogonal directions and has sufficient rigidity to retain a configuration imparted thereto, to position and to hold the lamps mounted on the arms at selected positions; and wherein
   each of the arms includes
      i) a multitude of telescopic elements, including at least a first telescopic element and a plurality of additional telescopic elements, and
      ii) means connecting the first telescopic element to the mounting means for universal pivoting movement relative to the mounting means; and the telescopic elements are arranged in sequence, and each of the additional telescopic elements is slidably supported by another of the telescopic elements, wherein the length of the arm is adjustable by sliding said additional telescopic elements.

21. A bicycle signalling device comprising:

means for mounting the signalling device on a bicycle;

first and second elongated, pliant arms connected to the mounting means and extending therefrom, each of the arms including
  i) an inner end connected to the mounting means, and
  ii) an outer end;

first and second signalling lamps mounted on the outer ends of the first and second arms respectively; and means for connecting each of the signalling lamps to an electric power source to selectively actuate the lamps;

wherein each of the arms is universally bendable in three mutually orthogonal directions and has sufficient rigidity to retain a configuration imparted thereto, to position and to hold the lamps mounted on the arms at selected positions; and wherein each of the arms includes
  i) a multitude of pairs of scissor links, including a first pair of scissor links and a plurality of additional pairs of scissor links, and
  ii) means connecting the first pair of scissor links to the mounting means for universal pivoting movement relative to the mounting means;

the pairs of scissor links are arranged in sequence, and each of the additional pairs of scissor links is supported by another of the scissor links; and each of the pairs of scissor links is supported for movement between an extended position and a retracted position, and the scissor links are moved between the extended and retracted positions to adjust the length of the arm.

* * * * *